US 8,079,630 B2

(12) United States Patent
Bruder et al.

(10) Patent No.: US 8,079,630 B2
(45) Date of Patent: Dec. 20, 2011

(54) MOVABLE ROOF PART IN AN AUTOMOBILE ROOF (75) Inventors: Gernot Bruder, Karlsruhe (DE); Marcus Papendorf, Bönnigheim (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 378 days.

(21) Appl. No.: 12/423,698

(22) Filed: Apr. 14, 2009

(65) Prior Publication Data

US 2009/0256383 A1     Oct. 15, 2009

(30) Foreign Application Priority Data

Apr. 15, 2008  (DE) .................... 10 2008 019 058

(51) Int. Cl.
*B60J 7/08* (2006.01)
(52) U.S. Cl. .................... 296/108; 296/107.17
(58) Field of Classification Search ............ 296/107.09, 296/107.11, 107.12, 107.16, 107.17, 108
See application file for complete search history.

(56) References Cited

U.S. PATENT DOCUMENTS

| | | | | |
|---|---|---|---|---|
| 3,536,354 | A * | 10/1970 | Ingram | 296/147 |
| 6,595,572 | B2 | 7/2003 | Schuler et al. | |
| 6,811,205 | B2 | 11/2004 | Salz et al. | |
| 7,237,823 | B2 * | 7/2007 | Bruder et al. | 296/107.08 |
| 7,618,080 | B2 * | 11/2009 | Bruder | 296/108 |
| 2001/0042991 | A1 | 11/2001 | Schuler et al. | |
| 2004/0094987 | A1 | 5/2004 | Salz et al. | |
| 2006/0138800 | A1 * | 6/2006 | Bruder et al. | 296/107.08 |
| 2007/0152469 | A1 * | 7/2007 | Papendorf et al. | 296/108 |
| 2007/0262605 | A1 | 11/2007 | Bruder | |
| 2007/0284910 | A1 * | 12/2007 | Bruder | 296/107.02 |
| 2009/0051190 | A1 * | 2/2009 | Wegener | 296/107.12 |

FOREIGN PATENT DOCUMENTS

| | | | |
|---|---|---|---|
| DE | 19960010 C1 * | 5/2001 | |
| DE | 10021333 C1 | 8/2001 | |
| DE | 10108493 A1 | 9/2001 | |
| DE | 101 16 094 A1 | 10/2002 | |
| DE | 20112267 U1 | 12/2002 | |
| DE | 10158938 A1 | 6/2003 | |
| DE | 10206650 A1 | 9/2003 | |
| DE | 102006020759 B3 * | 9/2007 | |
| DE | 102006020758 A1 * | 11/2007 | |
| DE | 102006062717 A1 | 11/2007 | |
| EP | 425156 A2 * | 5/1991 | |
| JP | 2007297044 A * | 11/2007 | |

* cited by examiner

*Primary Examiner* — Glenn Dayoan
*Assistant Examiner* — Paul Chenevert
(74) *Attorney, Agent, or Firm* — Brooks Kushman P.C.

(57) ABSTRACT

An assembly includes a roof part kinematic system having front and rear connecting rods. Each connecting rod is pivotally connected to a roof part and is pivotally connectable to a vehicle body such that the roof part kinematic system can move the roof part between end positions. The assembly further includes a spring-loaded kinematic system having a spring, a coupling rod, and a triangular-shaped spring lever. The spring is connected to the front connecting rod and is connected to the first spring lever corner, the coupling rod is connected to the rear connecting rod and is connected to the second spring lever corner, and the third spring lever corner is pivotally connectable to the vehicle body such that the spring produces a torque on the connecting rods to move the roof part away from either end position when the roof part is in that end position.

11 Claims, 10 Drawing Sheets

MOVABLE ROOF PART IN AN AUTOMOBILE ROOF

CROSS-REFERENCE TO RELATED APPLICATIONS

This application claims foreign priority benefits under 35 U.S.C. §119(a)-(d) to DE 10 2008 019 058.6, filed Apr. 15, 2008, which is hereby incorporated by reference in its entirety.

BACKGROUND OF THE INVENTION

1. Field of the Invention

The present invention relates to a roof assembly including a roof part, a roof kinematic system movably coupling the roof part to a vehicle such that the roof part is movable between end positions, and a transmission kinematic system arranged to improve the leverage in lifting the roof part from one end position and in slowing movement of the roof part as the roof part reaches the other end position.

2. Background Art

DE 101 16 094 A1 describes a roof assembly having a multi-part roof, a roof kinematic system, and a transmission kinematic system. The roof kinematic system movably couples the roof to a vehicle such that the roof is movable between a closed position in which the roof covers the interior of the vehicle and a storage position in which the roof is folded and stored in a rear compartment of the vehicle. The transmission kinematic system is arranged to improve leverage in the two end positions (i.e., the closed and storage positions) such that the roof can be lifted with a small force against the weight of the roof parts from either end position and such that the movement of the roof as the roof nears the opposite end position is slowed to achieve a shock-free landing. The transmission kinematic system has connecting rods and levers which entail a relatively high production cost and a relatively large amount of space.

SUMMARY OF THE INVENTION

An object of the present invention is to displace a movable roof part between closed and storage positions with simply designed and space saving means which require a reduced amount of force for the displacement motion.

In carrying out the above object and other objects, the present invention provides an assembly for a vehicle having a body. The assembly includes a roof part, a roof part kinematic system, and a spring-loaded kinematic system. The roof part kinematic system has a front connecting rod and a rear connecting rod relative to the direction of forward vehicle travel. The front connecting rod is pivotally connected at a first end to the roof part via a first roof part pivot joint, the rear connecting rod is pivotally connected at a first end to the roof part via a second roof part pivot joint, the front connecting rod is pivotally connectable at a second end to a vehicle body via a first vehicle body pivot joint, and the rear connecting rod is pivotally connectable at a second end to the vehicle body via a second vehicle body pivot joint such that the roof part kinematic system can move the roof part between a closed position and a storage position. The spring-loaded kinematic system has a spring, a coupling rod, and a spring lever having a triangular shape with first, second, and third corners. The spring is connected at a first end to the front connecting rod and is connected at a second end to the first corner of the spring lever, the coupling rod is connected at a first end to the rear connecting rod and is connected at a second end to the second corner of the spring lever, and the spring lever is pivotally connectable at the third corner to the vehicle body via a third vehicle body pivot joint such that the spring produces a first torque on the connecting rods to move the roof part away from the closed position when the roof part is in the closed position and such that the spring produces an opposite second torque on the connecting rods to move the roof part away from the storage position when the roof part is in the storage position.

In embodiments of the present invention, the spring-loaded kinematic system includes a spring that engages with a pivotably mounted connecting rod at one end and acts upon the connecting rod with a pivoting torque about its pivot joint. The connecting rod is pushed into the respective opposite end position by the torque of the spring. The torque of the spring acts in opposition to the torque that results from the weight of the roof part and the roof part kinematic system and forces the roof part into the current end position. According to this, the spring acts in opposition to the weight of the roof part so that only a reduced force is required to lift the roof part out of the respective end position.

During the transfer motion between the closed and storage positions, the effective line of action of the spring moves away through the position of the pivot joint of the connecting rod on which the spring bears. Due to the motion of the effective line of action through the position of the pivot joint, the direction of action reverses such that starting from the initial effect of assisting the lifting motion a slowing of the further transfer motion develops. The change occurs advantageously between the assisting, lifting, and slowing effects in the region of the highest point reached by the roof part, which is achieved about half way through the opening and closing motions. When this maximally lifted position is passed, the weight of the roof part no longer acts in the direction of the starting end position, but rather in the direction of the final end position, wherein the effect of the spring force slows the transfer motion so that the roof part reaches the final end position with reduced speed or is motionless. This is advantageous because additional braking measures to slow the roof part motion can be dispensed. Due to the very small approach speed at the end position, a gentle docking is achieved at the end position, thus preventing increased loading of the participating components.

In an embodiment of the present invention, the base point of the spring, which is turned away from the connecting rod, changes its position depending on the current position of the roof part. This is accomplished by a kinematic coupling with the roof part kinematic system such that the adjusting motion of the roof part kinematic system leads to a displacement of the base point of the spring and no additional actuators are required. The effective line of action of the spring and the leverage are also affected by the displacement of the spring base point below which the spring acts upon the connecting rod. Both effects taken together, specifically the angular change in the effective line of action of the spring and the position change of the base point, can be used to achieve the desired positive influence for reducing the lifting force from each end position as well as slowing during the approach to the opposite end position.

In an embodiment of the present invention, the spring base point is supported on a spring lever that is pivotably mounted on the vehicle body and is coupled to a second connecting rod of the roof part kinematic system. The second connecting rod, taken together with the first connecting rod, forms a four-bar linkage for displacing the roof part by the connecting rod acted upon by the spring. Other roof part kinematic systems that deviate from this can also be used such as diverse multiple-link kinematic systems like seven-link kinematic systems. The embodiment of a pivotably-mounted spring lever acted upon by the spring base point has the advantage of a relatively simple design in which the pivoting motion of the spring lever can be used to change the line of action of the spring, as well as the position of the spring base point. In particular, the motion of the spring base point assists the separating motion of the effective line of action through the pivot joint of the connecting rod on which the spring acts.

In an embodiment of the present invention, the effective line of action of the spring during the transfer of the roof part between the closed and storage position moves away above the position of the pivot joint of the spring lever on which the spring base point is retained. The effective line of action of the spring advantageously moves, at least approximately at the same time, over the position of the pivot joint of the spring lever and over the position of the pivot joint of the connecting rod. Until it reaches the position of the pivot joint of the spring lever, the spring base point is supported above the spring lever on the second connecting rod, so that not only the first connecting rod, but also the second connecting rod is acted upon by the spring in the direction of the opposite end position. When the pivot joint passes over the spring lever, it also produces a reversal of the effective direction on the second connecting rod. Since the position of the pivot joint of the first connecting rod is also simultaneously passed over, the effective direction of the spring also reverses with respect to this first connecting rod, so that the initial assisting effect of the spring in both connecting rods is now reversed to become a slowing effect in both connecting rods. The passing over of the effective line of action in both of the pivot joints is carried out upon achieving the maximally lifted position of the roof part.

The assisting effect starting from the end position holds for both of the closed and storage positions. The effect of the spring of both roof part motions is reversed upon arrival at the maximally lifted position of the roof part and thus both for the transfer from the closed position into the storage position and for the transfer from the storage position into the closed position.

It is likewise possible that the arrangement of the pivot joint of the connecting rod and the spring lever are chosen so that the effective line of action of the spring can move between these pivot joints during opening or closing of the roof part. A passing over of these pivot joints does not occur. This embodiment allows a particularly compact arrangement of all the components.

The spring is advantageously maintained under pretension in each end position in order to achieve the required assisting effect. The spring may be a compression spring or a tension spring.

The spring-loaded kinematic system with the spring serves the purpose that the roof part is supported in all of its positions to the greatest extent possible in the region of static equilibrium so that the actuator for moving the roof part only assumes the primary task of moving the roof part in opposition to frictional and inertial forces, but not to support the roof part such that correspondingly smaller sized actuators can be used. The same advantage is present if the roof part is to be manually adjusted since no lifting and slowing forces, or only very reduced forces, are required if a manual adjustment is possible, despite a relatively large roof part weight.

The combination of the two spring effects of the spring—namely the force of the spring at the coupling point to the pivotably mounted connecting rod and the reaction force in the spring base point, which are transmitted through additional levers and connecting rods to the second connecting rod—leads to a minimization of the peak drive torque over the entire path of motion. Peak torques in the opening and/or closing process of the roof part can be avoided. The springs at their coupling and base points can have opposing effects on the connecting rods in specific roof part positions during the transfer between the storage and closed positions. A strong effect of the spring on one connecting rod can be compensated for by an opposing effect on the other connecting rod. By appropriate selection of the coupling points and geometry the roof part motion automatically controls the assisting effect of the spring.

In an embodiment of the present invention, the roof part kinematics and the spring-loaded kinematic system are located with the spring on an additional support element. The pivot joints are formed as a part of the support element that holds the connecting rods of the roof part kinematic system. The mount for the spring lever is part of the support element. The spring inserted between a connecting rod of the roof part kinematic system and the spring lever can be a compression spring or a tension spring. A reversal of the force as previously described (tension to compression forces) of the spring need not necessarily take place, since the weight compensation in opening or closing roof systems depends on the pivot point, and thereby on the ratio between the pivot joints of the connecting rod and the spring lever. This means that while opening, the spring force acting to assist the opening process can exert a much smaller influence on, for example, the rear connecting rod for an opened roof than at the start of the opening process.

The same behavior is encountered, for example, with a front connecting rod that is mounted pivotably on a spring lever above a pivot point fixed to the connecting rod by a coupler. Here the spring likewise acts as a compression spring for opening the roof, and assists the opening process of the front connecting rod through the spring lever. Upon passing the reversal point of the front connecting rod, the opening force reverses to a slowing force. The spring effect continues to exist as a compression force, with the front connecting rod now being supported during the end phase of the opening process of the roof.

The above features, and other features and advantages of the present invention as readily apparent from the following detailed descriptions thereof when taken in connection with the accompanying drawings.

DETAILED DESCRIPTION OF THE PREFERRED EMBODIMENT(S)

In the figures, the same components are designated by the same reference numbers.

Figure 1:
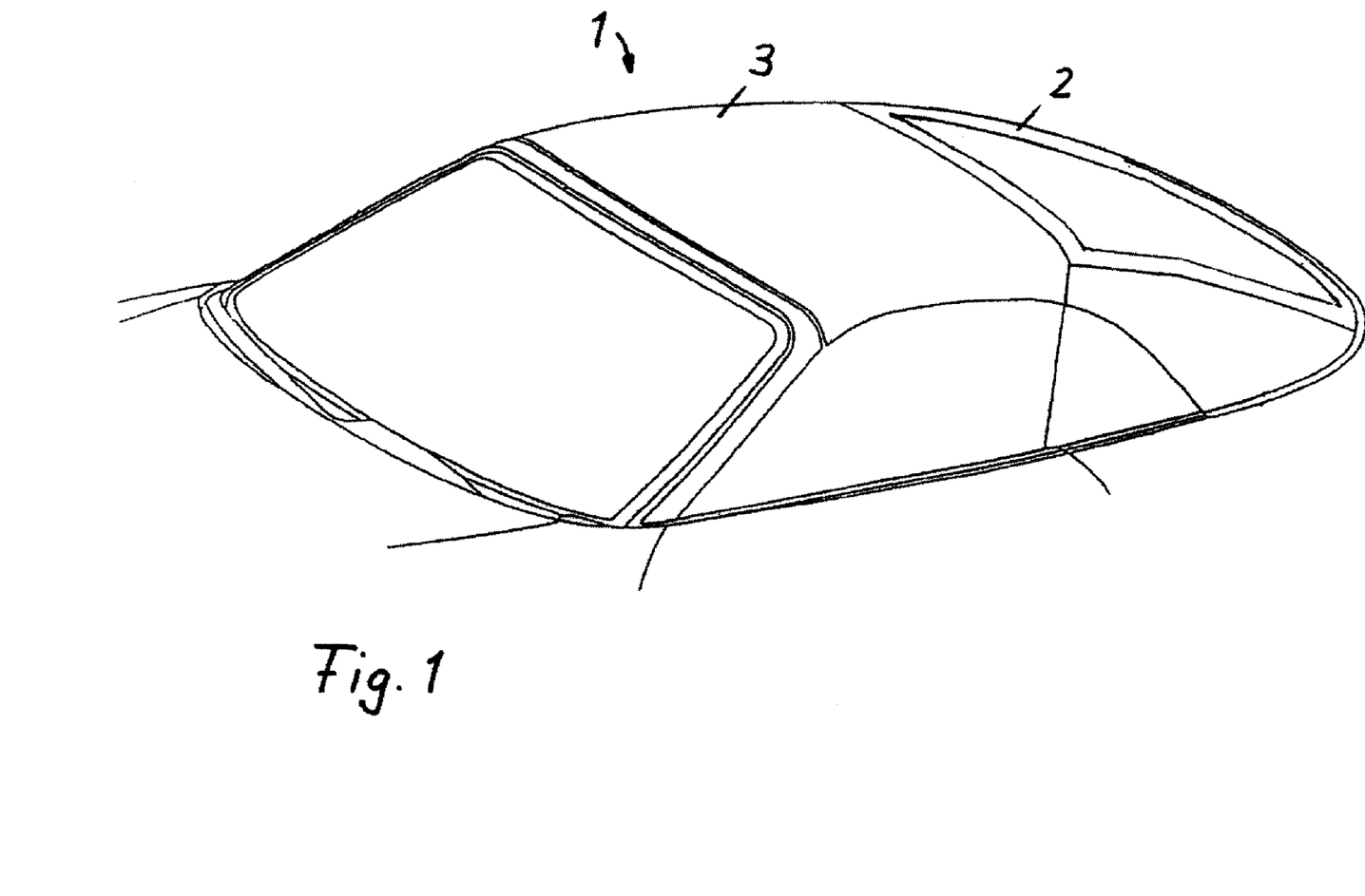
FIG. 1 illustrates a perspective view of a roof assembly for a vehicle in which the roof assembly includes a roof having front and rear roof parts movable between a closed position in which the roof parts cover the interior of the vehicle and a storage position in which the roof parts are folded and stored within a rear storage compartment of the vehicle in accordance with an embodiment of the present invention with the roof parts being in the closed position.

Referring now to FIG. 1, a perspective view of a roof assembly for a vehicle in accordance with an embodiment of the present invention is shown. The roof assembly includes a roof 1 having a rear roof part 2 and a front roof part 3. Roof 1 is a two-part hardtop in which roof parts 2, 3 are movable between a closed position (shown in FIG. 1) and a storage position. In the closed position, roof 1 extends between the front windshield frame of the vehicle and a trunk lid of the vehicle with roof parts 2, 3 covering the interior of the vehicle. The trunk lid covers a rear storage compartment of the vehicle. In the storage position, roof parts 2, 3 are folded and stored within the rear storage compartment. Roof parts 2, 3 are movable between the closed and storage positions as at least one of roof parts 2, 3 can be pivoted about a pivot point fixed to the body of the vehicle. In accordance with other embodiments of the present invention, roof 1 may be a soft top having a top cover fabric and a top linkage assembly or may have three or more roof parts in which at least one of the roof parts can be pivoted about a pivot point fixed to the body of the vehicle.

A roof kinematic system movably couples at least one of roof parts 2, 3 to the vehicle body. The roof kinematic system is activated to move roof parts 2, 3 between the closed and storage positions. For instance, the roof kinematic system is activated to move roof parts 2, 3 from one end position such as the closed position to the opposite end position such as the storage position. In this case, roof parts 2, 3 are lifted out of the closed position and pivoted toward the rear into the storage compartment. The relative position between roof parts 2, 3 is hereby changed as well as the relative position of roof parts 2, 3 to the body of the vehicle. During the transfer motion between the closed and storage positions, roof parts 2, 3 pass through an intermediate position in which the center of gravity of roof parts 2, 3 is lifted to a maximum height. Until this maximally lifted position is reached, an adjusting force must be applied through an actuator that acts in opposition to the weight of roof parts 2, 3, which acts on roof parts 2, 3 in the starting end position. When the maximally lifted position is passed, the weight of roof parts 2, 3 (and the roof kinematic system) acts in the direction opposite the end position, the actuator then having the task of controlling the roof motion so that the end position is reached with little or no velocity for which the actuator must act in opposition to the weight of roof parts 2, 3 and from then on has a slowing effect.

Referring now to FIGS. 2, 3, 4, 5, and 6, schematic views of front roof part 3 along with a roof part kinematic system 4 and a spring-loaded kinematic system 8 of a roof assembly in accordance with an embodiment of the present invention are shown. In FIGS. 2, 3, 4, 5, and 6, front roof part 3 is shown in an exemplary manner in various phases between the closed position and the storage position. In particular, front roof part 3 is in the closed position in FIG. 2. Roof part 3 is in an intermediate position between the closed position and the maximally lifted position in FIG. 3. Roof part 3 is in the maximally lifted position in FIG. 4. Roof part 3 is in an intermediate position between the maximally lifted position and the storage position in FIG. 5. Roof part 3 is in the storage position in FIG. 6.

Figure 2:
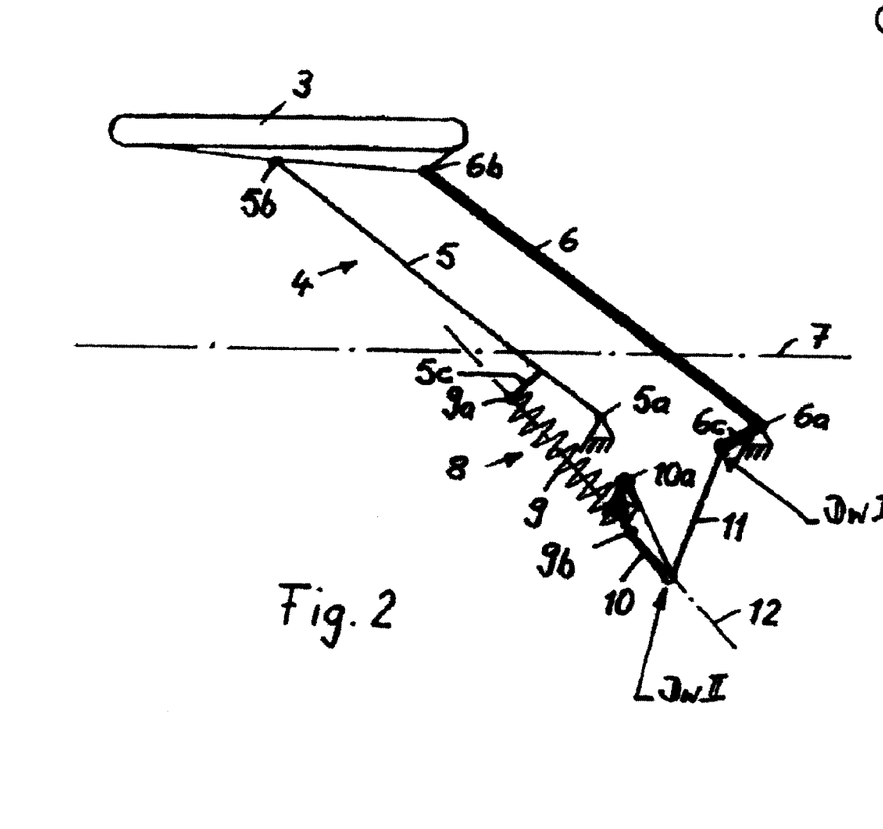
FIG. 2 illustrates a schematic view of the front roof part along with a roof part kinematic system and a spring-loaded kinematic system of a roof assembly in accordance with an embodiment of the present invention with the front roof part being in the closed position.

Roof part kinematic system 4 is part of the roof kinematic system for moving roof parts 2, 3 between the closed and storage positions. Roof part kinematic system 4 movably couples front roof part 3 to vehicle body 7 such that roof part 3 is movable between the closed and storage positions. Roof parts 2, 3 are interconnected such that movement of roof part 3 between the closed and storage positions causes roof part 2 to correspondingly move between the closed and storage positions. Roof part kinematic system 4 is a four-bar linkage and includes a front connecting rod 5 and a rear connecting rod 6. Front connecting rod 5 has a pivot joint 5a connected to vehicle body 7 and a pivot joint 5b pivotably coupled with roof part 3. The second parallel-oriented rear connecting rod 6 is analogously coupled pivotably through a pivot joint 6a to vehicle body 7 and to roof part 3 through an opposing pivot joint 6b.

Spring-loaded kinematic system 8 is connected kinematically upstream of roof part kinematic system 4. Spring-loaded kinematic system 8 includes a spring 9, a spring lever 10, and a coupling lever 11 through which spring lever 10 is kinematically coupled to rear connecting rod 6 of roof part kinematic system 4. Spring 9 is a compression spring. Spring 9 has an upper contact point 9a and a spring base point 9b lying opposite spring contact point 9a. Spring contact point 9a is connected to an extension 5c of front connecting rod 5 at a distance from pivot joint 5a on the side where pivot joint 5a connects to vehicle body 7. Spring base point 9b lies opposite spring contact point 9a above which spring 9 is connected to spring lever 10. Spring lever 10 is pivotably coupled to vehicle body 7 through a pivot joint 10a which is offset with respect to spring base point 9b. Coupling rod 11 engages with spring lever 10 through a pivot joint DwII. Pivot joint DwII is offset both to spring base point 9b and to pivot joint 10a on the side of vehicle body 7. Coupling rod 11 is attached to an extension 6c on the other end through pivot joint DwI. Extension 6c is a fixed component of rear connecting rod 6 and branches from pivot joint 6a. Pivot joint DwI between coupling rod 11 and extension 6c lies at a distance from pivot joint 6a of rear connecting rod 6. Spring base point 9b and pivot joint DwII between spring lever 10 and coupling rod 11 can also coincide in an alternative embodiment.

In the closed position of roof part 3 shown in FIG. 2, the effective line of action 12 of spring 9 passes through spring contact point 9a and spring base point 9b and is located in front of pivot joint 5a of front connecting rod 5 and pivot joint 10a of spring lever 10. Spring 9 is under pretension in each end position (i.e., in each of the closed and storage positions) such that an opening torque (clockwise in the view of FIG. 2) is produced about pivot joint 5a by front connecting rod 5 on the side of vehicle body 7. The opening torque is based on the distance between spring engagement point 9a and extension 5c on front connecting rod 5 to pivot joint 5a on the vehicle body side. At the same time, the reaction force that is introduced through spring base point 9b in spring lever 10 causes a torque about pivot joint 10a on the vehicle body side of spring lever 10 in the counterclockwise direction. In turn, spring lever 10 through coupling rod 11 gives rise to a rotational motion of rear connecting rod 6 about pivot joint 6a on the vehicle body side in the clockwise direction. The rotational motion of rear connecting rod 6 is in the same direction as the torque about pivot joint 5a on the vehicle body side of front connecting rod 5. Thus, in the closed position of roof part 3, spring 9 causes both an opening torque about pivot joint 5a of front connecting rod 5 and an opening torque about pivot joint 6a of rear connecting rod 6. The adjustment forces that must be applied by the actuator are thereby minimized.

Figure 3:
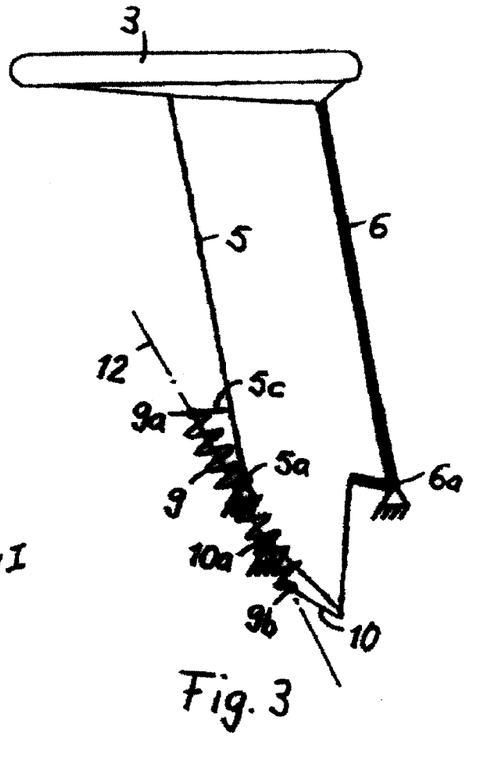
FIG. 3 illustrates a schematic view of the front roof part, the roof part kinematic system, and the spring-loaded kinematic system of the roof assembly shown in FIG. 2 with the front roof part being in an intermediate position between the closed position and the maximally lifted position in which the maximally lifted position is approximately in the middle of a transfer motion between the closed and storage positions.

In FIG. 3, roof part 3 is in an intermediate position during the transfer motion from the closed position to the storage position just prior to roof part 3 reaching the maximally lifted position. The effective line of action 12 of spring 9 is still located in the position of pivot joint 5a of front connecting rod 5 and pivot joint 10 of spring lever 10 such that the effective direction of spring 9 is still the same as in the closed position of roof part 3. As such, roof part 3 is again subjected to a force in the direction of the opposite end position (i.e., the storage position). However, the force produced by spring 9 is smaller as spring 9 has expanded. Additionally, the effective lever arm is smaller such that the spring action behaves like load torque which is minimized in this case as roof part 3 is located near its static equilibrium position.

Figure 4:
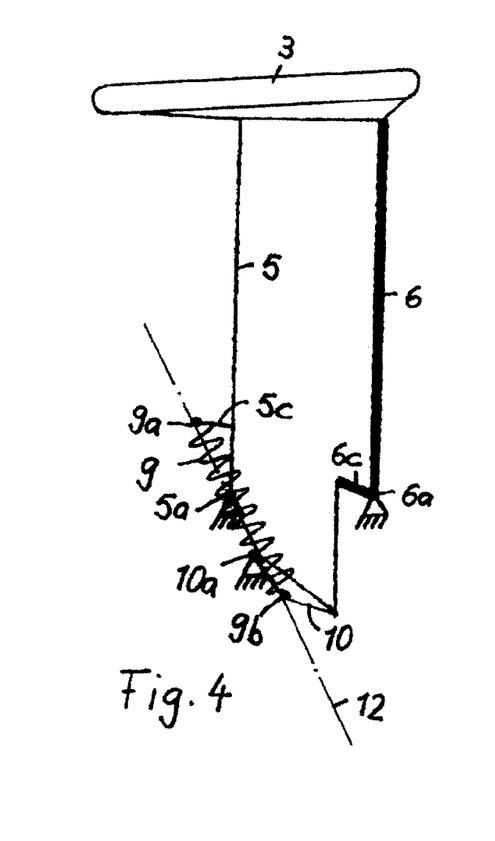
FIG. 4 illustrates a schematic view of the front roof part, the roof part kinematic system, and the spring-loaded kinematic system of the roof assembly shown in FIG. 2 with the front roof part being in the maximally lifted position.

In FIG. 4, roof part 3 is in the maximally lifted position during the transfer motion from the closed position to the storage position. The maximally lifted position is approximately in the middle of the transfer motion between the closed and storage positions. In the maximally lifted position, the effective line of action 12 of spring 9 passes through the axes of pivot joint 5a on the vehicle body side of front connecting rod 5 and pivot joint 10a of spring lever 10. As a result, spring 9 is unable to produce a resultant torque about pivot joints 5a, 10a on the vehicle body side despite the continued tension in spring 9. As roof part 3 and roof part kinematic system 4 are in labile equilibrium in the maximally lifted position, further motion of roof part 3 must be produced only by the actuator which acts on roof part kinematic system 4 and produces the displacement motion between the closed and storage positions. Due to the equilibrium position of roof part 3 in the maximally lifted position, very small actuating forces or torques suffice for this purpose.

Figure 5:
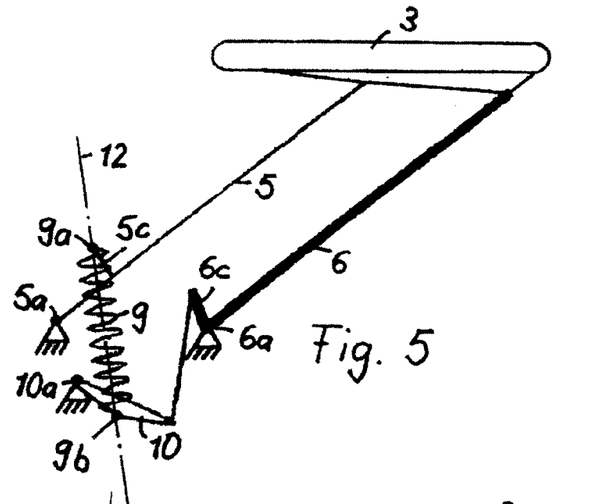
FIG. 5 illustrates a schematic view of the front roof part, the roof part kinematic system, and the spring-loaded kinematic system of the roof assembly shown in FIG. 2 with the front roof part being in an intermediate position between the maximally lifted position and the storage position.

In FIG. 5, roof part 3 is in an intermediate position between the maximally lifted position and the storage position. As such, roof part 3 has passed the maximally lifted position from the closed position and is now headed to the storage position. When the maximally lifted position is passed, the weight of roof part 3 and roof part kinematic system 4 act in the direction toward the storage position. From this point on, the effective line of action 12 of spring 9 lies beyond pivot joint 5a of front connecting rod 5 and pivot joint 10a of spring lever 10 on the vehicle body side due to the further advanced position of roof part 3. As such, the effective line of action 12 of spring 9 lies on the opposite side compared to the positions of roof part 3 prior to reaching the maximally lifted position. The effective direction of spring 9 has consequently reversed such that a slowing effect is achieved on both connecting rods 5, 6 from the initial lifting effect. Consequently, less slowing force needs to be applied by the actuator than in a configuration without spring 9.

Figure 6:
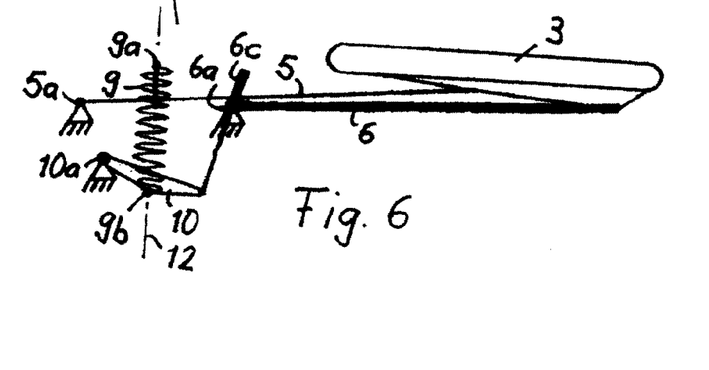
FIG. 6 illustrates a schematic view of the front roof part, the roof part kinematic system, and the spring-loaded kinematic system of the roof assembly shown in FIG. 2 with the front roof part being in the storage position.

In FIG. 6, roof part 3 is in the storage position. Due to the pivoting motion of spring lever 10 about pivot joint 10a on the vehicle body side, the direction of the effective line of action 12 of spring 9, with respect to both of connecting rods 5, 6, changes to that effect so that the sum of the torques resulting from both effects corresponds to the load torque produced by the weight of roof part 3 and roof part kinematic system 4. In this example, the effective lever arm about pivot joint 6a is equal to zero. Another combination of the effective lever arm appears in the opposing closed position (shown in FIG. 2) with the effect that the resulting lifting torque of the pretensioned spring-loaded kinematic system 8 used to lift roof part 3 from the closed position lies in the neighborhood of the static load torque. This is also valid in each intermediate position.

When roof part 3 is transferred in the opposite direction (i.e., from the storage position to the closed position), the same lever ratios are valid in each position of roof part 3 as during the transfer from the closed position to the storage position. Only the driving and slowing directions of the actuator are reversed. Due to the equivalence of the torque behavior of the drive torque required to make the transfer from the closed position to the storage position, as well as in the reverse direction, relatively small drive forces or torques suffice in either case to carry out the positioning motion of roof part 3.

Figure 7:
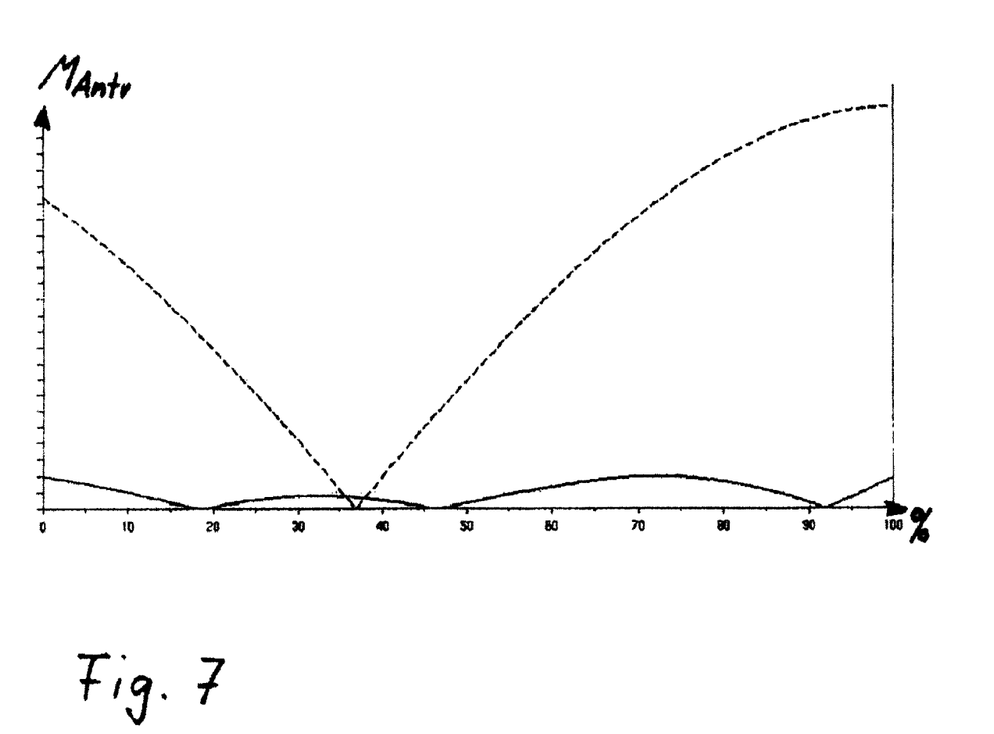
FIG. 7 illustrates a diagram plotting the behavior of the drive torque of an actuator to move the roof of the roof assembly in accordance with an embodiment of the present invention (shown as the solid line) and to move a conventional roof (shown as the dashed line)

Referring now to FIG. 7, a diagram plotting the drive torque of an actuator to move roof part 3 (shown as the solid line) and to move a conventional roof part (shown as the dashed line) is shown. The diagram includes a graph showing the progression of the amount of drive torque $M_{Antr}$ as a function of the instantaneous roof part position, which is plotted as a percentage of the kinematic process during the transfer of a roof part between the closed and storage positions. The drive torque for a conventional roof part is plotted as a dashed line and the drive torque for roof part 3 is plotted as a solid line. As shown, the drive torque $M_{Antr}$ has a maximum value for the conventional roof part respectively in the closed position (kinematic path=0%) and in the storage position (kinematic path=100%), and the drive torque is reduced to zero between these maxima at the apex of the roof motion.

This means that a maximum drive torque must be applied to counter the weight of the roof part in both end positions in order to lift the roof part out of an end position and to transfer the roof part in the direction of the opposite end position. For roof part 3, a very flat drive torque curve is obtained that has a significantly smaller magnitude than that of the conventional roof part. Pronounced values of maximum torque do not occur and the curve fluctuates within a relatively small range of drive torque values.

Referring now to FIGS. 8, 9, 10, and 11, schematic views of front roof part 3 along with roof part kinematic system 4 and a spring-loaded kinematic system 8 of a roof assembly in accordance with another embodiment of the present invention are shown. The kinematic structure of this roof assembly fundamentally corresponds to that of the roof assembly shown in FIGS. 2, 3, 4, 5, and 6 such that in this respect the explanations presented there can be used as a reference. However, one difference is that in this roof assembly spring 9 is a tension spring and exercises a tensile force due to its pretension at both end positions at its point of contact 9a as well as its spring base point 9b.

In FIGS. 8, 9, 10, and 11, front roof part 3 is shown in an exemplary manner in various phases between the closed and storage positions. In particular, roof part 3 is in the closed position in FIG. 8. Roof part 3 is in the maximally lifted position in FIG. 9. Roof part 3 is in an intermediate position between the maximally lifted position and the storage position in FIG. 10. Roof part 3 is in the storage position in FIG. 11.

Figure 8:
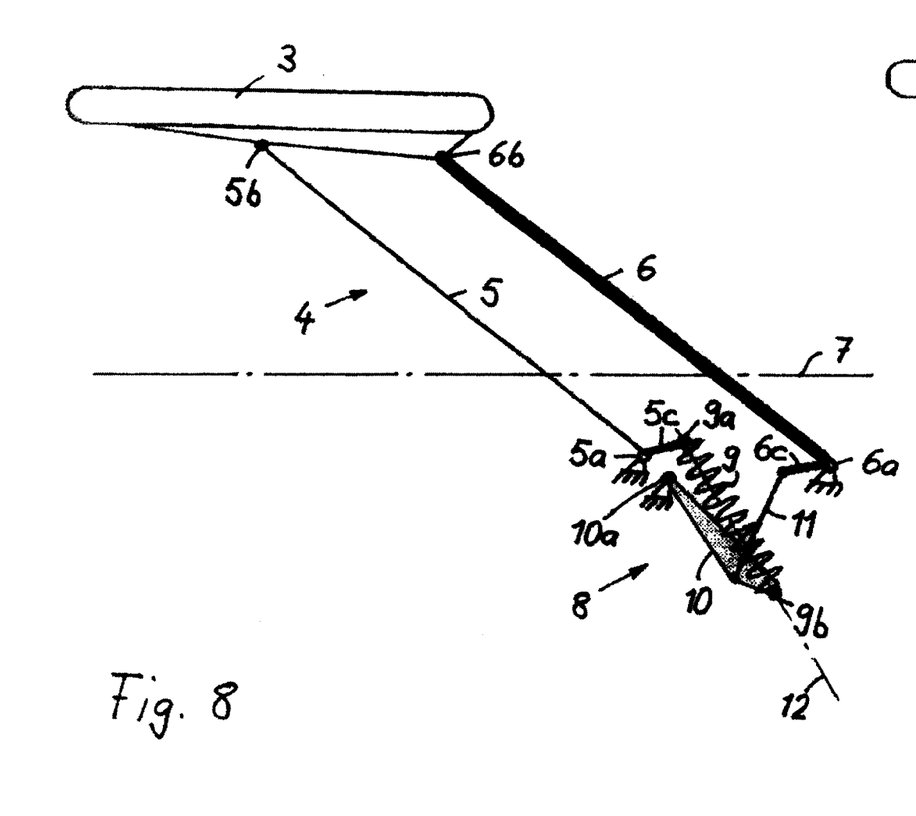
FIG. 8 illustrates a schematic view of the front roof part along with the roof part kinematic system and a spring-loaded kinematic system of a roof assembly in accordance with another embodiment of the present invention with the front roof part being in the closed position.

In the closed position shown in FIG. 8, pivot joint 5a of front connecting rod 5 and pivot joint 10a of spring lever 10 on the vehicle body side at which spring base point 9b is also attached, lie on the same side of the effective line of action 12 through tension spring 9. A clockwise torque is produced about pivot joint 5a on the vehicle body side due to the pretension of tension spring 9 and the distance between coupling point 9a on extension 5c and pivot joint 5a of front connecting rod 5. The clockwise torque acts on front connecting rod 5 in the direction of the opposing storage position about pivot joint 10a of spring lever 10. The clockwise torque is also transmitted through coupling rod 11 and extension 6c due to the geometric arrangement of spring lever 10 and front connecting rod 5 as a clockwise torque about pivot point 6a on the vehicle body side of rear connecting rod 6. Tension spring 9 consequently produces a torque on both pivot joints 5a, 6a in the closed position of roof part 3 which acts on connecting rods 5, 6 in the direction of the opposing storage position.

Figure 9:
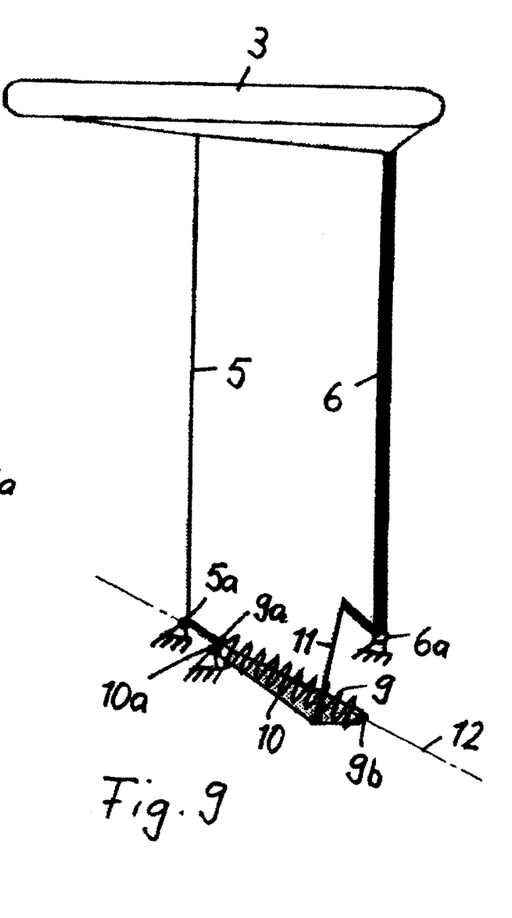
FIG. 9 illustrates a schematic view of the front roof part, the roof part kinematic system, and the spring-loaded kinematic system of the roof assembly shown in FIG. 8 with the front roof part being in the maximally lifted position.

In FIG. 9, roof part 3 is in the maximally lifted position (i.e., apex position) during the transfer motion between the closed and storage positions. The effective line of action 12 of tension spring 9 approximately intersects pivot joints 5a, 10a on the vehicle body side of front connecting rod 5 or spring lever 10 such that the spring force gives rise to little or no resultant torque.

Figure 10:
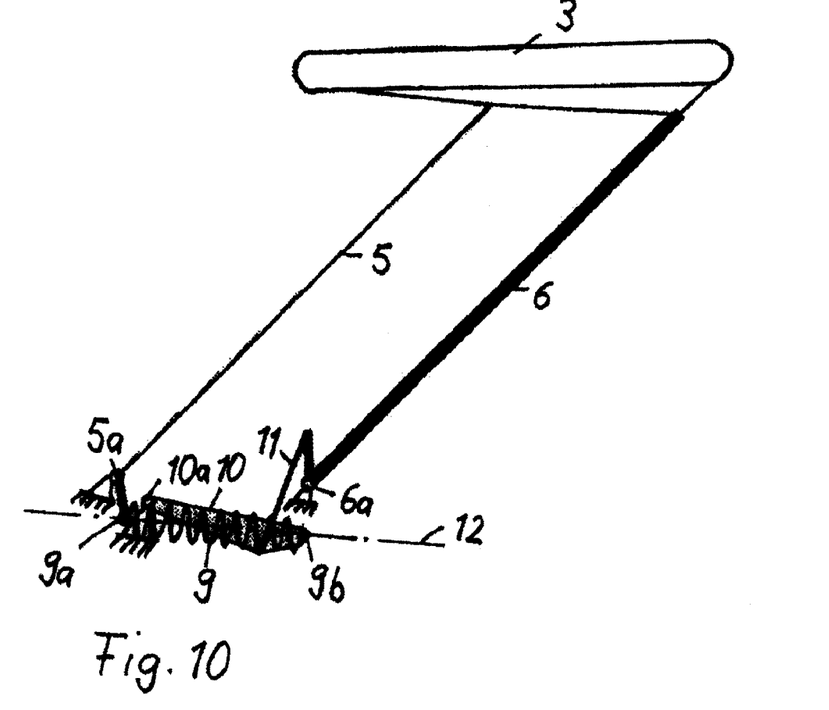
FIG. 10 illustrates a schematic view of the front roof part, the roof part kinematic system, and the spring-loaded kinematic system of the roof assembly shown in FIG. 8 with the front roof part being in an intermediate position between the maximally lifted position and the storage position.
Figure 11:
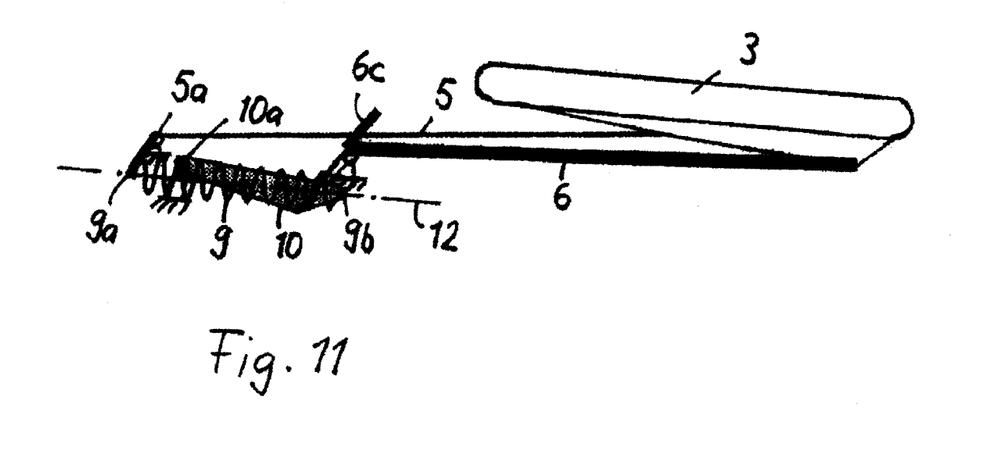
FIG. 11 illustrates a schematic view of the front roof part, the roof part kinematic system, and the spring-loaded kinematic system of the roof assembly shown in FIG. 8 with the front roof part being in the storage position.

In the case of further advanced roof part positions according to FIGS. 10 and 11, pivot joints 5a and 10a on the vehicle body side lie on the opposite side of the effective line of action 12 in comparison to the closed position according to FIG. 8. This implies a reversal of the effective direction of spring 9 on connecting rods 5, 6, which from now on experience a resultant torque in the opposite direction (i.e., towards the closed position). An approximately balanced force and/or torque behavior is achieved in this manner during the subsequent procedure until the storage position is reached in which the weight of roof part 3 and/or roof part kinematic system 4 is balanced. As a result, an approximately balanced force and torque behavior is achieved, both during the lifting motion between the closed position and the maximally lifted position and between the maximally lifted position and arrival at the storage position. The same is true for the roof motion in the opposite direction (i.e., from the storage position into the closed position).

Referring now to FIGS. 12, 13, 14, and 15, schematic views of front roof part 3, roof part kinematic system 4, and spring-loaded kinematic system 8 of a roof assembly in accordance with another embodiment of the present invention are shown with the views depicting the roof part from the closed position to the storage position. Spring-loaded kinematic system 8 including a compression spring 9, a spring lever 10, and a coupling rod 11 to roof part kinematic system 4 arranged on a support element 13. Connecting rods 5, 6 of roof part kinematic system 4 are pivotably mounted over pivot joints 5a, 6a on support element 13. Similarly, pivot joint 10a of spring lever 10 is a part of support element 13. Spring lever 10 is a lever that has a bearing between its ends and is pivotably connected to pivot joint 10a. Coupling rod 11 is included as coupling component between an extension 5c of front connecting rod 5 and an end of spring lever 10. The other end of spring lever 10 is flexibly connected to one end of spring 9 while the other end acts through an extension 6c on rear connecting rod 6.

Figure 12:
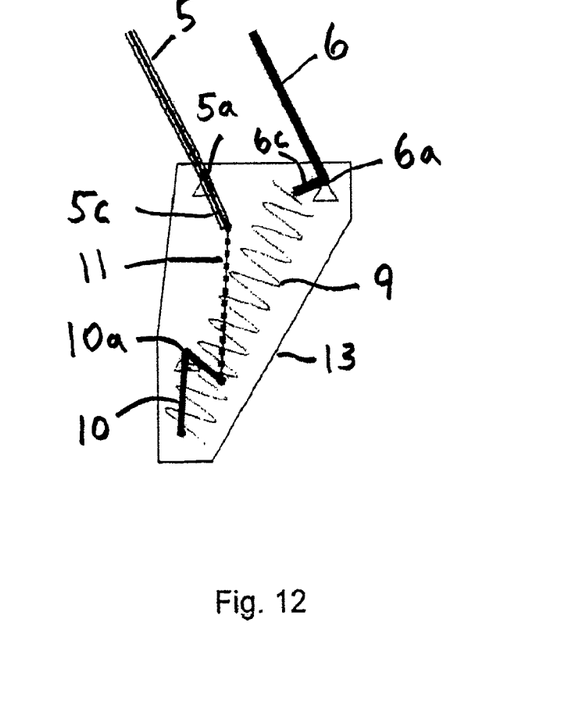
FIGS. 12, 13, 14, and 15 illustrate schematic views of the front roof part, the roof part kinematic system, and the spring-loaded kinematic system of a roof assembly in accordance with another embodiment of the present invention with the views depicting the roof part from the closed position to the storage position.
Figure 13:
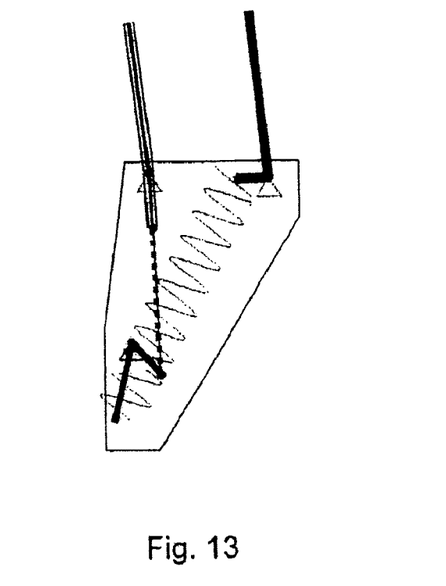

Support element 13 can, for example, be mounted on the vehicle body in a fixed position or can be used as an intermediately mounted component that is adjustable in all directions. Support element 13 itself may be pivotably mounted to the vehicle body, similar to a connecting rod, wherein support element 13 can also be driven by an active adjusting element.

Spring 9 is a compression spring 9 and acts to assist rear connecting rod 6. The compressive force of spring 9 produces a clockwise torque through spring lever 10, which again assists front connecting rod 5 in the opening motion through coupling rod 11.

At the reversal point between opening and closing of roof part 3, (see FIG. 13), no assisting force acts on front connecting rod 5 since its extension 5c assumes a common line with coupling rod 11 and spring lever 10 cannot be pivoted further. The entire spring force of spring 9 now acts on extension 6c of rear connecting rod 6 which continues to receive assistance in the opening process.

Figure 14:
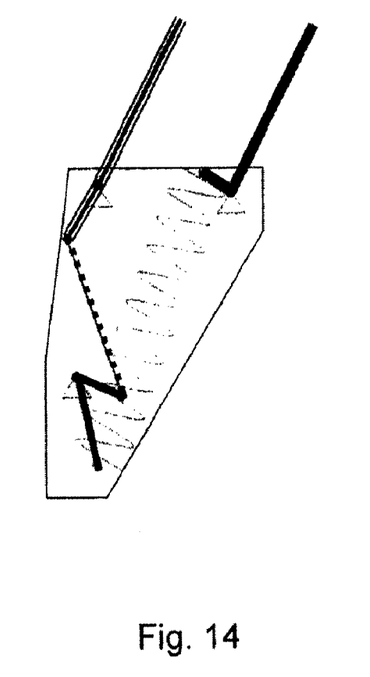

In FIG. 14, roof part 3 is located just in front of its opened end position. Rear connecting rod 6, which wants to fall into its end position due to its weight, is now slowed in this motion by spring 9. Front connecting rod 5 exhibits the same tendency as rear connecting rod 6, but is slowed in its opening motion by spring 9 and is pressed into the closed position. Even though spring 9 is a compression spring, a force equilibrium arises between front and rear connecting rods 5, 6. Roof part 3 is in a balanced state with respect to the forces acting on connecting rods 5, 6.

Although not shown here, support element 13 can now also experience an assisting force acting in a direction, for example, a pivoting motion of support element 13 in which support element 13 is actively pivoted about an axis.

Figure 15:
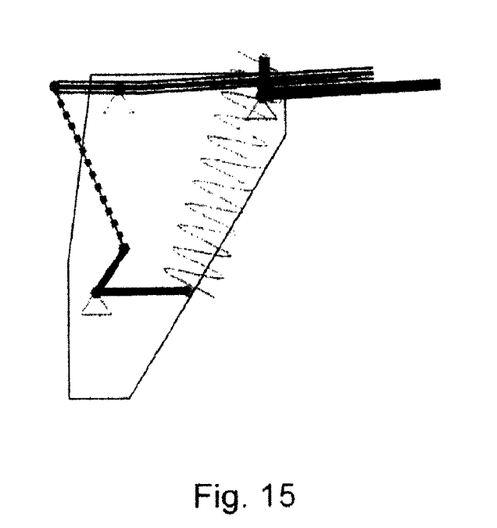

FIG. 15 shows roof part kinematic system 4 in its fully opened roof position. Spring 9 at this point produces a small opening force on roof part 3 at rear connecting rod 6. Spring lever 10 experiences a maximum force of spring 9 on the long side of the lever, and transmits this force by coupling rod 11 to extension 5c of front connecting rod 5, which thus experiences a positioning torque. In this position both connecting rods 5, 6 assist in the direction of closing roof part 3. Support element 13 can likewise be moved to actively assist by a control element.

In FIGS. 16, 17, 18, and 19, analogous to FIGS. 12, 13, 14, and 15, roof part kinematic system 4 with spring-loaded kinematic system 8 of a roof assembly in accordance with another embodiment are shown. Spring 9 of spring-loaded kinematic system 8 is a tension spring. The mechanical advantages of the extension 5c and spring lever 10 are altered to match tension spring 9.

Figure 16:
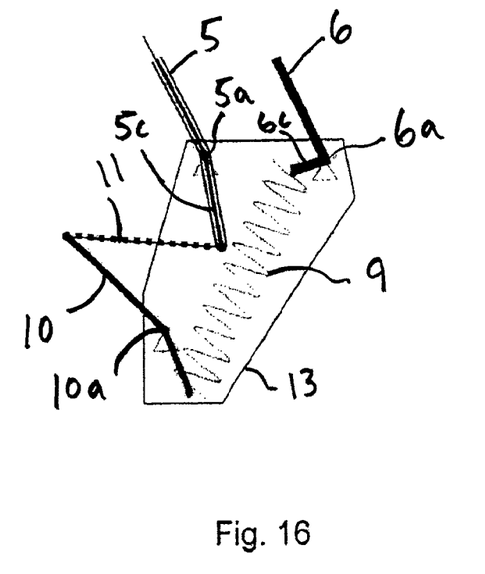
FIGS. 16, 17, 18, and 19 illustrate schematic views of the front roof part, the roof part kinematic system, and the spring-loaded kinematic system of a roof assembly in accordance with another embodiment of the present invention with the views depicting the roof part from the closed position to the storage position.

In FIG. 16, tension spring 9 produces a counterclockwise torque on rear connecting rod 6 and a clockwise torque on front connecting rod 5. The two opposing torques are designed by the lever ratios of extensions 5c, 6c and spring lever 10 such that force balancing occurs and connecting rods 5, 6 are in equilibrium.

Figure 17:
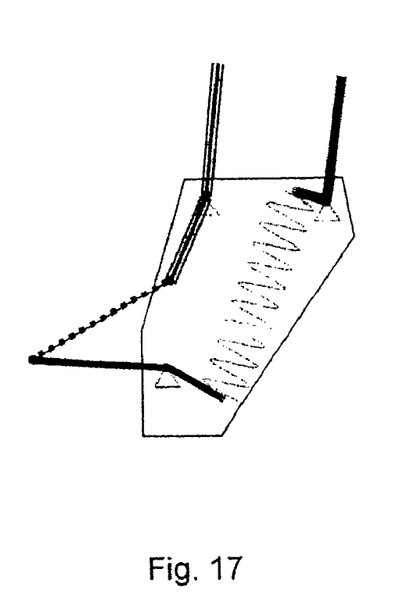
Figure 18:
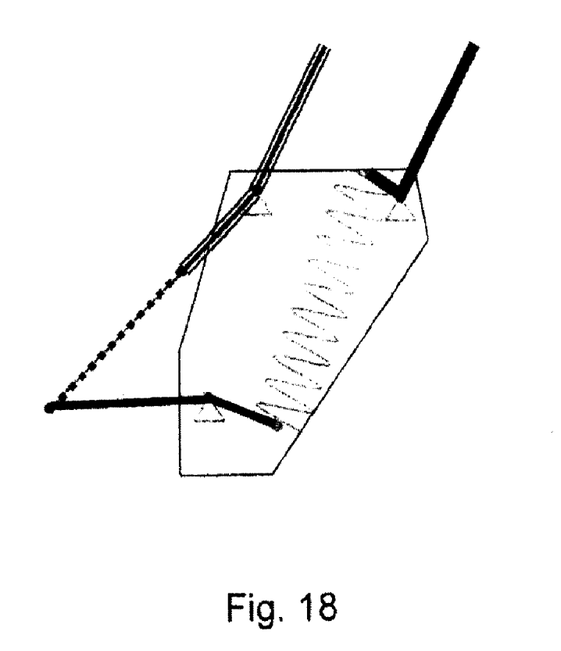

FIG. 17 shows connecting rods 5, 6 in a further opened position, wherein the torque acting on connecting rods 5, 6 balance as in FIG. 16. In FIG. 18, extension 5c and coupling rod 11 are oriented in the same direction and are thus not subject to any additional torque. The opening torque caused by the weight on rear connecting rod 6 is compensated in this position by the tension force of spring 9 so that both connecting rods 5, 6 are in an equilibrium position.

Figure 19:
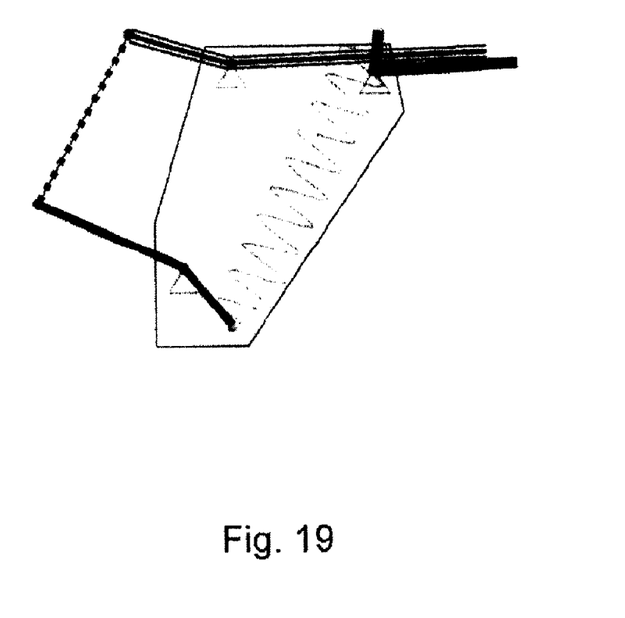

FIG. 19 shows connecting rods 5, 6 in the completely opened position. Both connecting rods are subjected to a torque in the direction of closing roof part 3. This is in equilibrium with respect to connecting rods 5, 6 that are retained in position and equilibrium by the weight of connecting rods 5, 6.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An assembly for a vehicle having a body, the assembly comprising:
   a roof part;
   a support element pivotally mountable to the vehicle body;
   a roof part kinematic system having a front connecting rod and a rear connecting rod relative to the direction of forward vehicle travel, wherein the front connecting rod is pivotally connected at a first end to the roof part via a first roof part pivot joint, the rear connecting rod is pivotally connected at a first end to the roof part via a second roof part pivot joint, the front connecting rod is pivotally connected at a second end to the support element via a first vehicle body pivot joint, and the rear connecting rod is pivotally connected at a second end to the support element via a second vehicle body pivot joint such that the roof part kinematic system can move the roof part between a closed position and a storage position; and
   a spring-loaded kinematic system having a spring, a coupling rod, and a spring lever having a triangular shape with first, second, and third corners, wherein the spring is connected at a first end to the rear connecting rod and is connected at a second end to the first corner of the spring lever, the coupling rod is connected at a first end to the front connecting rod and is connected at a second end to the second corner of the spring lever, and the spring lever is pivotally connected at the third corner to the support element via a third vehicle body pivot joint such that the spring produces a first torque on the connecting rods to move the roof part away from the closed position when the roof part is in the closed position and such that the spring produces an opposite second torque on the connecting rods to move the roof part away from the storage position when the roof part is in the storage position.

2. The assembly of claim 1 wherein:
the spring is a compression spring.

3. The assembly of claim 1 wherein:
the spring is a torsion spring.

4. The assembly of claim 1 wherein:
the front connecting rod includes an extension, wherein the first end of the coupling rod is connected to the extension of the front connecting rod.

5. The assembly of claim 1 wherein:
the rear connecting rod includes an extension, wherein the first end of the spring is connected to the extension of the rear connecting rod.

6. The assembly of claim 5 wherein:
the extension of the rear connecting rod extends in front of the rear connecting rod in the direction of forward vehicle travel.

7. The assembly of claim 1 wherein:
when the roof part is in the closed position, the connecting rods run diagonally rearward from the roof pivot joints to the vehicle body pivot joints.

8. The assembly of claim 7 wherein:
the spring produces a spring force acting along an effective line of action, wherein the spring with its effective line of action makes an acute angle with respect to the front rear connecting rod.

9. A vehicle comprising:
   a vehicle body;
   a roof part;
   a support element pivotally mounted to the vehicle body;
   a roof part kinematic system having a front connecting rod and a rear connecting rod relative to the direction of forward vehicle travel, wherein the front connecting rod is pivotally connected at a first end to the roof part via a first roof part pivot joint, the rear connecting rod is pivotally connected at a first end to the roof part via a second roof part pivot joint, the front connecting rod is pivotally connected at a second end to the support element via a first vehicle body pivot joint, and the rear connecting rod is pivotally connected at a second end to the support element via a second vehicle body pivot joint such that the roof part kinematic system can move the roof part between a closed position and a storage position relative to the vehicle body; and
   a spring-loaded kinematic system having a spring, a coupling rod, and a spring lever having a triangular shape with first, second, and third corners, wherein the spring is connected at a first end to the rear connecting rod and is connected at a second end to the first corner of the spring lever, the coupling rod is connected at a first end to the front connecting rod and is connected at a second end to the second corner of the spring lever, and the spring lever is pivotally connected at the third corner to the support element via a third vehicle body pivot joint such that the spring produces a first torque on the connecting rods to move the roof part away from the closed position when the roof part is in the closed position and such that the spring produces an opposite second torque on the connecting rods to move the roof part away from the storage position when the roof part is in the storage position.

10. The vehicle of claim 9 wherein:
the spring is a compression spring.

11. The vehicle of claim 9 wherein:
the spring is a torsion spring.

* * * * *

UNITED STATES PATENT AND TRADEMARK OFFICE
CERTIFICATE OF CORRECTION

| | | |
|---|---|---|
| PATENT NO. | : 8,079,630 B2 | |
| APPLICATION NO. | : 12/423698 | |
| DATED | : December 20, 2011 | |
| INVENTOR(S) | : Gernot Bruder | |

It is certified that error appears in the above-identified patent and that said Letters Patent is hereby corrected as shown below:

Column 12, Line 25, Claim 8:

After "with respect to the" delete "front".

Signed and Sealed this
Sixth Day of March, 2012

David J. Kappos
*Director of the United States Patent and Trademark Office*